Inventor
Ralph R. Clayton

Dec. 27, 1932.  R. R. CLAYTON  1,892,097
MILK COOLING APPARATUS
Filed Aug. 26, 1931  4 Sheets-Sheet 3

Inventor
Ralph R. Clayton
By Clarence A. O'Brien
Attorney

Dec. 27, 1932.  R. R. CLAYTON  1,892,097
MILK COOLING APPARATUS
Filed Aug. 26, 1931   4 Sheets-Sheet 4
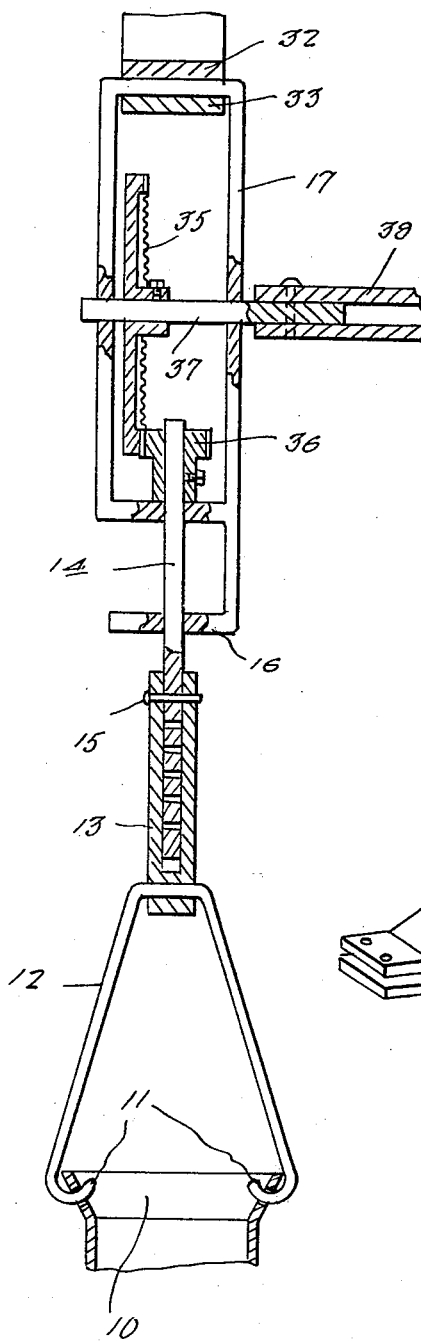
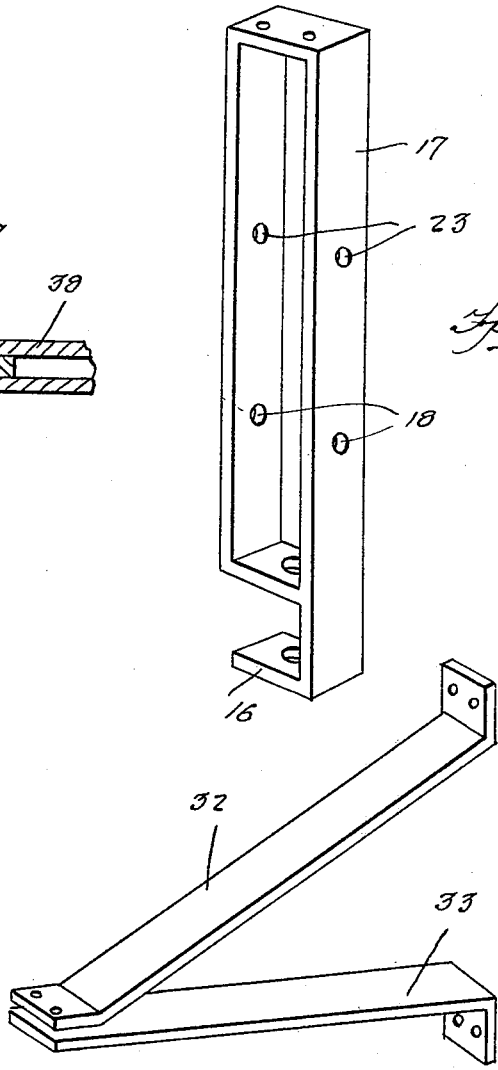
Inventor
Ralph R. Clayton
By Clarence A. O'Brien
Attorney Patented Dec. 27, 1932

1,892,097

UNITED STATES PATENT OFFICE

RALPH R. CLAYTON, OF YORKVILLE, ILLINOIS

MILK COOLING APPARATUS

Application filed August 26, 1931. Serial No. 559,525.

This invention relataes to an improved apparatus especially constructed for dairy usage, and particularly useful in cooling milk and cream while it is contained in a conventional milk can.

So far as I have been able to ascertain from ordinary observation, many types of machines and devices have been constructed and utilized for milk cooling purposes Those devices with which I am familiar are generally cumbersome in construction, consume unnecessary time to secure appropriate results, are sometimes quite expensive, and frequently not adaptable of fulfilling the requirements of a structure of this class in a manner which corresponds to my idea of a suitable and satisfactory apparatus for the purpose.

With the foregoing thought and noticeable objections in mind, I have invented a novel structure organization of parts, which I believe is an appreciable contribution to the art and trade, and capable of better fulfilling the requirement of an apparatus of this classification.

Briefly stated, I accomplish the desired result by utilizing a simple support, a rotary hanger for the milk can, practical operating means for rotating the hanger, and an ordinary water filled tank in which the can is submerged during the period of rotation.

The particular parts and relative association constituting the aforesaid novelty will become more readily apparent from the following drawings and the explanatory detailed description, as well as the concluding claims.

In the drawings:

Figure 4 is a view in section and elevation illustrating the rotary milk can suspension means and drive therefor.

Figure 5 is a perspective view of a hanger frame.

Figure 6 is a perspective view of a two-part wall attaching bracket.

Figure 1:
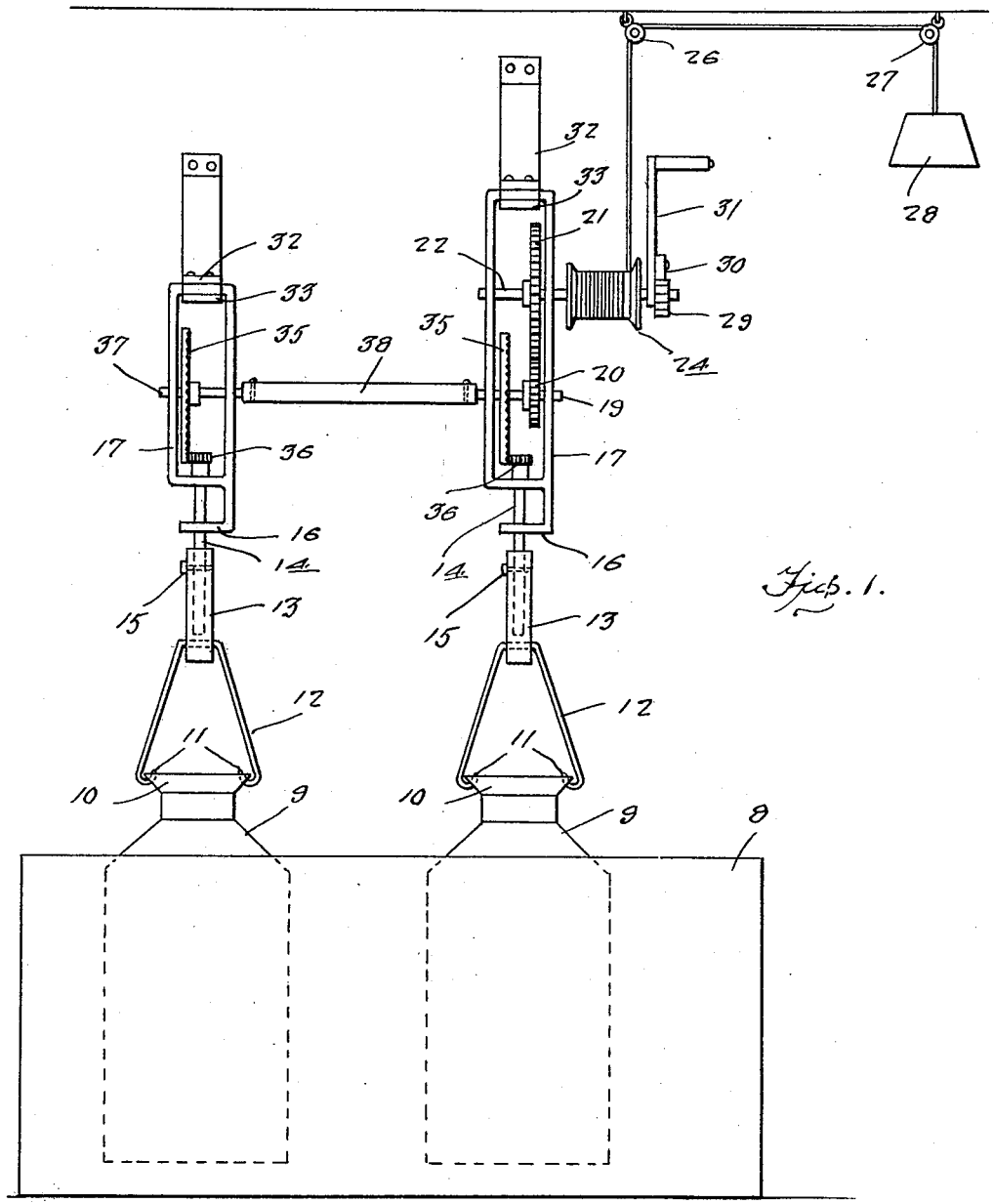
Figure 1 is an elevational view illustrating a dual or duplex arrangement embodying the essential features of a milk cooling apparatus developed in accordance with the present inventive conception.
Figure 2:
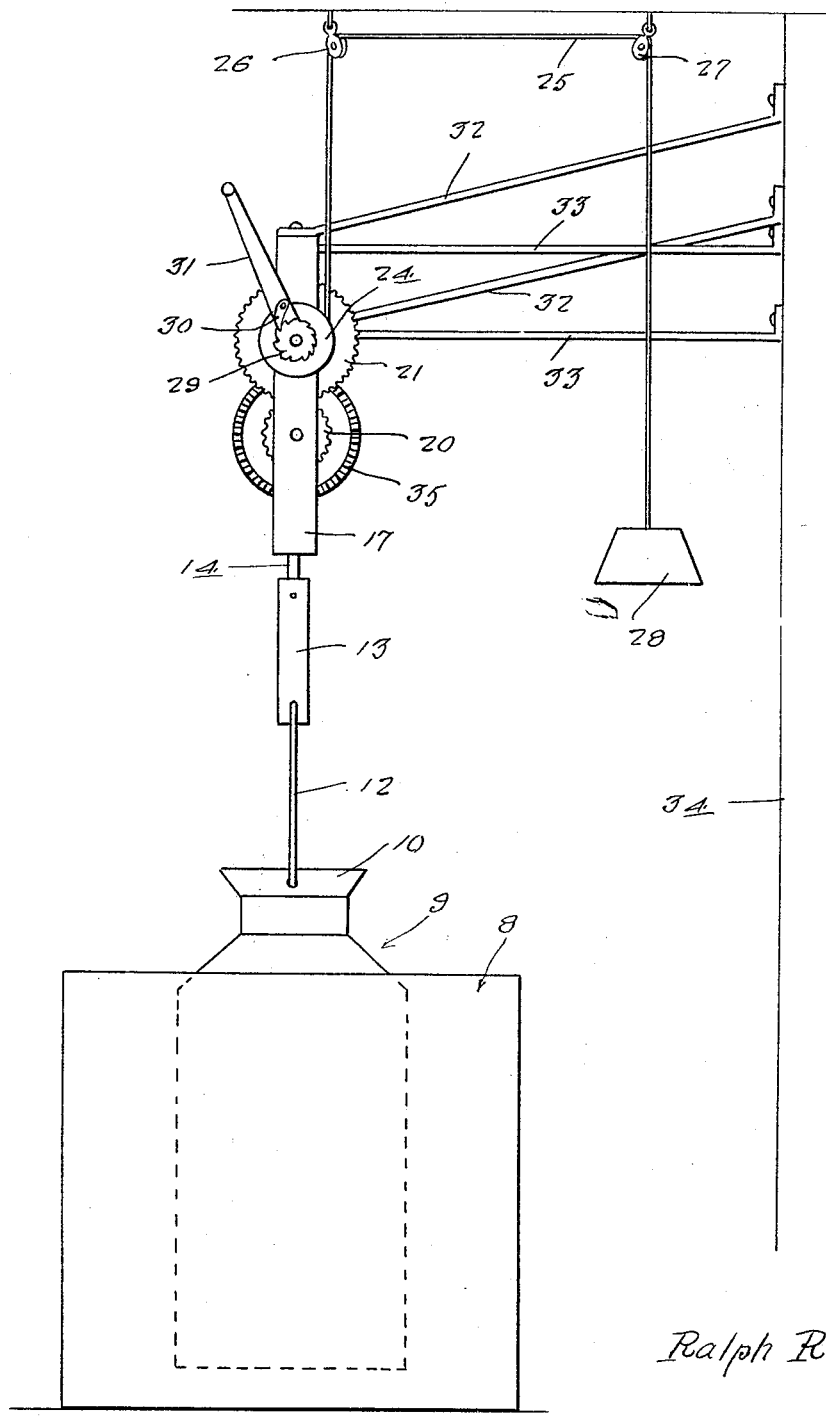
Figure 2 is an end elevation observing the structure as in Figure 1 as directed from right to left.
Figure 3:
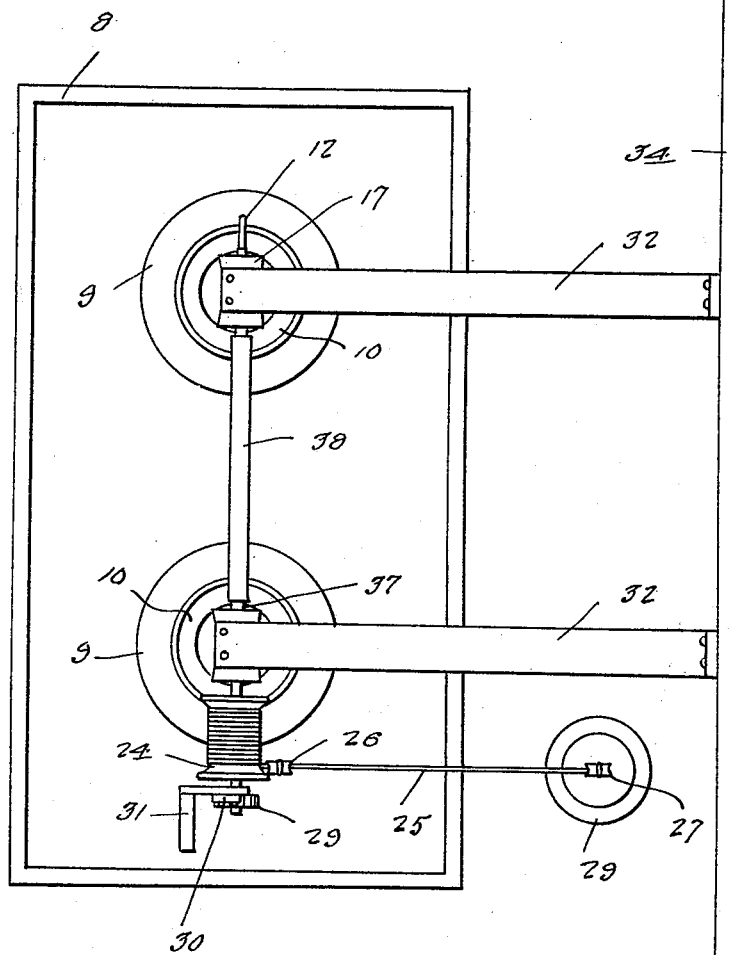
Figure 3 is a top plan view of said structure.
Figure 7:
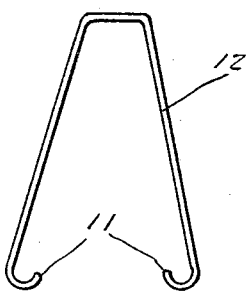
Figure 7 is an elevational view of a can gripping and suspending bail.

In accordance with the invention, the structure may be of a single unit type of double unit arrangement, in fact the unit can be multiplied according to the discretion of the owner. For the sake of clearness I will describe the two units as main and supplementary but it will be observed that the essential parts are identical. Referring to the drawings with this in mind, it will be seen that the numeral 8 represents a water containing cooling tank. This is of suitable capacity. The milk can 9 is of ordinary construction and the rim 10 is provided with diametrically opposite apertures to accommodate the connecting hooks 11 on a substantially U-shaped suspension bail 12. This may be of wire of appropriate strength. The bite portion of this bail is swingably mounted in a passage formed in the lower end portion of a slip coupling or socket 13. This socket is adapted for reception of the apertured end portion of the rotary shaft 14, the connection between the parts 13 and 14 being made through an adjustable connecting pin 15. The shaft 14 extends through an inturned apertured arm 16 formed integrally with the lower end portion of the hanger frame 17. The frame 17 is vertically elongated or rectangular in configuration and as seen in Figure 5 is provided with spaced opposed bearing holes 18 to accommodate a horizontal stub shaft 19. This shaft is provided with a driving gear 20 in mesh with a relatively large companion gear 21 which companion gear is on the propeller shaft 22 journalled in the upper bearing holes 23 of the frame. On the extended end portion of this shaft 22 is a spool-like drum 24 on which an operating cable 25 is wound. This cable is trained over suitable pulleys 26 and 27 and provided on its free end with a counter weight 28. Also keyed on the shaft 22 at the outer end thereof and beyond the drum is a ratchet wheel 29 with which a pawl 30 and a crank handle 31 is cooperable for winding the cable on the drum and for allowing consequent unwinding of the cables on the drum under action of the descending weight 28. The numerals 32 and 33 designate the complemental straps of a wall attaching bracket, said straps being passed through the upper part of the frame 22 and anchored on the wall or other stationary support 34 as seen in Figure 3.

Referring again to the shaft 19 it will be observed that it is surrounded with an actuating gear 35 in operating mesh with a pinion 36 keyed to the upper end of the perpendicular suspension and rotating shaft 14. Incidentally the part 13 together with the part 14 forms a vertically extensible shaft which permits the can 9 to be elevated sufficiently in the tank to clear the bottom thereof and facilitate rotation of the can. A supplemental can rotating and cooling unit embodies substantially the same construction and like parts designated by like reference characters throughout the same. For the sake of distinction however the stub shaft is denoted by the numeral 37 and this is coupled to the main stub shaft 19 through the medium of a power transmitting coupling rod or sleeve 38. Thus both units are simultaneously operated from a single source of power. Moreover as before stated these units can be definitely multiplied for an apparatus requiring greater capacity.

Interpreting the operation of the device as based on the main or right hand unit, it will be observed that by grasping the crank 31 and rotating it in the proper direction the pawl 30 cooperating with the ratchet 29 will rotate the drum 24 in a direction to wind the cable 25 on said drum. This will of course elevate the counter weight 28. During this cable winding operation, the milk can 9 may or may not be secured to the bail 12. Incidentally in securing the bail 12, the milk can is first lowered into the water in the tank 8 and the hooked arms of the bail spread apart and engaged in the apertures in the rim 9. At this time pin 15 can be removed so as to lower the socket 13, after which the bail, socket and can, can be elevated and the pin 15 reinserted. Thus the milk can be poured into the can to relieve the operator of any unnecessary trouble. Under the arrangement shown the can is turned in the water during the time of winding the cable on the drum. Then after the pawl and ratchet mechanism is released, the weight 28 begins to descend slowly unwinding the cable from the drum and as the drum 24 is keyed on the propeller shaft 22, it is obvious that the gear 21 thereon cooperating with the gear 20 will in turn rotate the actuating shaft 19. Moreover the gears 35 and 36 being in constant mesh rotates the suspension shaft 14 and the result is that the milk can is turned in the water in the tank 8. This produces a circulation of water around the can and also causes the milk in the can to swirl by centrifugal action. Consequently, the cooling action is more evenly distributed and made effective because of the circulation of water in the tank about said can.

When the supplemental unit at the left is used in conjunction with the main unit, it is simultaneously operated through the medium of an extension coupling 38 and its associated stub shaft 37.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. In a device of the character described, an elongated frame, rigid bracket arms secured to one end of the frame for supporting it from and in spaced relation to a support, said frame at its other end being provided with a depending arm having a laterally disposed end spaced from and paralleling the lower end of the frame, a shaft rotatably supported by said lateral end of the arm and the proximate end of the frame, a bail, a socket member pivotally connected with the closed end of the bail, said socket member receiving the lower end of said shaft, and means for securing said socket member on said shaft at the desired adjustment longitudinally of said shaft.

2. In a milk cooling apparatus, a suspension device comprising a frame, means for securing the frame in fixed vertical position, a shaft, means for rotatably mounting the shaft on the frame at the lower end of the latter, said shaft being provided with a longitudinal series of relatively spaced apertures, a socket member engaging the shaft and having oppositely disposed coinciding apertures for registry with a selected one of said series of apertures, a pin engageable with the apertures in said socket member and an aperture on said shaft for securing the socket member at the desired longitudinal adjustments, said socket member adjacent its free end being also provided with an opening extending transversely therethrough, a bail having its closed end engaging in the last named aperture, and hooks on the sides of the bail at the open end thereof.

3. In a milk cooling apparatus, comprising a main unit and a supplemental unit, each of said units including an oblong frame, rigid suspension brackets secured at one end thereof to one end of said frame, said frame at its other end having an arm extending longitudinally therefrom and terminating in a lateral extension paralleling the last named end of said frame, a shaft rotatably supported by said lateral end of said arm, and said last named end of the frame, a transverse shaft journalled in said frame, motion transmitting means connecting said shafts, driving means connected with the transverse shaft of the main unit, motion transmitting means connecting the transverse shaft of the main unit with the corresponding shaft of the supplementary unit, and a can engaging a suspension means on the first mentioned shaft of each unit and adjustable longitudinally of said shaft.

In testimony whereof I affix my signature.

RALPH R. CLAYTON.